(12) United States Patent
Stanislowski et al.

(10) Patent No.: US 9,630,840 B2
(45) Date of Patent: Apr. 25, 2017

(54) COOLING SYNGAS VIA REACTION OF METHANE OR LIGHT HYDROCARBONS WITH WATER

(71) Applicants: Joshua J. Stanislowski, Grand Forks, ND (US); Michael J. Holmes, Thompson, ND (US); Michael L. Swanson, Grand Forks, ND (US)

(72) Inventors: Joshua J. Stanislowski, Grand Forks, ND (US); Michael J. Holmes, Thompson, ND (US); Michael L. Swanson, Grand Forks, ND (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 0 days.

(21) Appl. No.: 15/185,741

(22) Filed: Jun. 17, 2016

(65) Prior Publication Data

US 2016/0368766 A1  Dec. 22, 2016

Related U.S. Application Data

(60) Provisional application No. 62/181,291, filed on Jun. 18, 2015.

(51) Int. Cl.
*B01J 8/06* (2006.01)
*B01J 8/00* (2006.01)
(Continued)

(52) U.S. Cl.
CPC  *C01B 3/34* (2013.01); *C10J 3/82* (2013.01); *C01B 2203/0877* (2013.01);
(Continued)

(58) Field of Classification Search
CPC .............. C07C 29/1518; C01B 3/382; C01B 2203/0877; C01B 3/34; C10J 2300/0916;
(Continued)

(56) References Cited

U.S. PATENT DOCUMENTS

2006/0128818 A1 *  6/2006  Wang ................. B01J 8/0488
518/702
2007/0289214 A1 * 12/2007  Briesch ............... C10J 3/463
48/61
(Continued)

OTHER PUBLICATIONS

"Tampa Electric Polk Power Station Integrated Gasification Combined Cycle Project", Final Technical Report, (Aug. 2002), 260 pgs.
(Continued)

*Primary Examiner* — Anthony J Zimmer
*Assistant Examiner* — Syed Iqbal
(74) *Attorney, Agent, or Firm* — Schwegman Lundberg & Woessner, P.A.

(57) ABSTRACT

Various embodiments disclosed relate to cooling shale gas via reaction of methane, light hydrocarbons, or a combination thereof, with water. In various embodiments, the present invention provides a method of cooling syngas. The method includes contacting the hot syngas with methane or light hydrocarbons. The hot syngas includes water and has a temperature of about 800° C. to about 3000° C. The contacting is effective to endothermically react the methane or light hydrocarbons with the water in the hot syngas to form carbon monoxide and hydrogen and to provide a cooled syngas having a lower temperature than the hot syngas.

20 Claims, 6 Drawing Sheets

(51) Int. Cl.
*B01J 3/00* (2006.01)
*C01B 3/34* (2006.01)
*C10J 3/82* (2006.01)

(52) U.S. Cl.
CPC .. *C10J 2300/093* (2013.01); *C10J 2300/0916* (2013.01); *C10J 2300/0946* (2013.01); *C10J 2300/0959* (2013.01); *C10J 2300/0976* (2013.01); *C10J 2300/1846* (2013.01); *C10J 2300/1853* (2013.01)

(58) Field of Classification Search
CPC .......... C10J 2300/093; C10J 2300/0946; C10J 2300/0959; C10J 2300/0976; C10J 2300/1846; C10J 2300/1853; C10J 3/82
See application file for complete search history.

(56) References Cited

U.S. PATENT DOCUMENTS

| | | |
|---|---|---|
| 2009/0126273 A1 | 5/2009 | Barnicki |
| 2014/0008578 A1 | 1/2014 | Wang et al. |
| 2015/0126627 A1 | 5/2015 | Apanel et al. |
| 2016/0176793 A1* | 6/2016 | Chakravarti ........ C07C 29/1518 518/703 |

OTHER PUBLICATIONS

"International Application Serial. No. PCT/US2016/038099, International Search Report mailed Sep. 23, 2016", 4 pgs.
"International Application Serial. No. PCT/US2016/038099, Written Opinion mailed Sep. 23, 2016", 7 pgs.

* cited by examiner

COOLING SYNGAS VIA REACTION OF METHANE OR LIGHT HYDROCARBONS WITH WATER

CROSS-REFERENCE TO RELATED APPLICATION

This application claims the benefit of priority to U.S. Provisional Patent Application Ser. No. 62/181,291 filed Jun. 18, 2015, the disclosure of which is incorporated herein in its entirety by reference.

BACKGROUND

Many of the high-temperature gasification system vendors today offer two design choices: direct water quenching or heat exchange-type syngas cooling. Direct quenching provides a reliable design from an operations standpoint with minimal downtime, but all of the heat contained in the syngas is lost, and a significant energy penalty is realized. Syngas coolers allow for heat recovery and increased efficiency. However, ash-plugging problems in syngas coolers have led to significant amounts of downtime of commercial gasification units, and much research has been attempted to solve these issues. Due to operational concerns such as ash-plugging in the cooler, many gasification facilities elect to take the energy penalty and directly quench the syngas.

SUMMARY OF THE INVENTION

In various embodiments, the present invention provides a method of cooling syngas. The method includes contacting a hot syngas with methane, light hydrocarbons, or a combination thereof. The hot syngas includes water. The hot syngas has a temperature of about 800° C. to about 3000° C. The contacting is effective to endothermically react the methane or light hydrocarbons with the water in the hot syngas to form carbon monoxide and hydrogen and to provide a cooled syngas having a lower temperature than the hot syngas.

In various embodiments, the present invention provides a method of cooling syngas. The method includes contacting a hot syngas with methane, light hydrocarbons, or a combination thereof. The hot syngas includes water. The hot syngas has a temperature of 800° C. to about 1600° C. The contacting is effective to endothermically react the methane or light hydrocarbons with the water in the hot syngas to form carbon monoxide and hydrogen and to provide a cooled syngas having a temperature about 300° C. to about 1000° C. lower than the temperature of the hot syngas. About 50% to 100% of total heat removed from the hot syngas during transformation of the hot syngas to the cooled syngas is heat removed via the endothermic reaction of the methane, light hydrocarbons, or a combination thereof with the water.

In various embodiments, the methane or light hydrocarbon quench of the present invention can be used to supplement or replace heat exchange-type syngas coolers. Heat exchange-type syngas coolers have significant ash-handling issues which has led to downtime in commercial gasification systems. In various embodiments, the present invention can avoid ash-handling issues, decreasing downtime and providing more efficient syngas generation. Heat exchange-type syngas coolers use high-temperature materials and metallic heat exchange tubes to exchange the heat in the syngas to produce steam. In various embodiments, the present invention can avoid the need for utilization of expensive high-temperature materials. In various embodiments, the present invention can avoid or reduce the use of metallic heat exchange surfaces.

In various embodiments, the methane or light hydrocarbon quench of the present invention can be used to supplement or replace a direct water quench. Direct water quenching designs waste thermal energy. In various embodiments, in contrast to direct water quenching designs, using methane, light hydrocarbons, methane-containing gases, or light hydrocarbon-containing gases as a quench medium to cool the syngas via endothermic reaction of the methane or light hydrocarbons with water allows for recovery of the thermal energy in the syngas in the form of additional syngas production via the carbon monoxide and hydrogen generated from the reaction of the methane or light hydrocarbons and water (e.g. steam methane or light hydrocarbon reforming). In various embodiments, the methane or light hydrocarbon quench of the present invention can be combined with other processes that generate methane or light hydrocarbons, such as a Fischer-Tropsch process, such that the methane or light hydrocarbons generated can be recycled back to the quench section for cooling and additional syngas production. In various embodiments, the methane or light hydrocarbon quench of the present invention can destroy or reduce the concentration of organics heavier than methane or light hydrocarbons, which can prevent or reduce coking during later catalytic reforming processes.

In various embodiments, the methane or light hydrocarbon quench of the present invention can increase the hydrogen to carbon monoxide ratio of the syngas, which can improve the quality of the syngas for formation of liquid fuels, ammonia, and hydrogen production. In various embodiments, the methane or light hydrocarbon quench of the present invention can decrease the carbon dioxide concentration of the syngas via better integrated thermal efficiency and via a higher hydrogen to carbon monoxide ratio.

In various embodiments, a wide variety of methane-containing or light hydrocarbon-containing gases can be used to perform the methane or light hydrocarbon quench of the present invention, such as natural gas, such as pipeline quality gas, or shale gas, stranded natural gases, unprocessed natural gases. In various embodiments, the methane or light hydrocarbon quench of the present invention can operate in the presence of high levels of sulfur and particles, such as in the hot syngas, in the methane, or in the light hydrocarbon feed source. In various embodiments, performing the quench with natural gas can provide reforming of the natural gas without pretreatment to remove or decrease the concentration of sulfur. In various embodiments, the methane or light hydrocarbon quench can be performed upstream, downstream, or a combination thereof, of slag removal. In various embodiments, a Joule-Thompson separation can be used to inject heavier components of shale gas in the gasifier and the lighter components in the downstream catalytic reactor, enabling reforming of substantially all components.

In various embodiments, the methane or light hydrocarbon quench of the present invention can operate without the addition of extra water or steam to the hot syngas. In various embodiments, water or steam can be added to the hot syngas to facilitate the endothermic reaction between the methane or light hydrocarbons and water in the syngas. In various embodiments, steam from other sections of the process, including low-grade steam, can be recycled for use as additional water in the hot syngas. In various embodiments, incorporation of recycled low-grade steam can avoid heat of vaporization energy penalties associated with other means of disposing of the steam.

In various embodiments, the methane or light hydrocarbon quench of the present invention can avoid the formation of additional tar species, which are generally considered undesirable in gasification processes.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
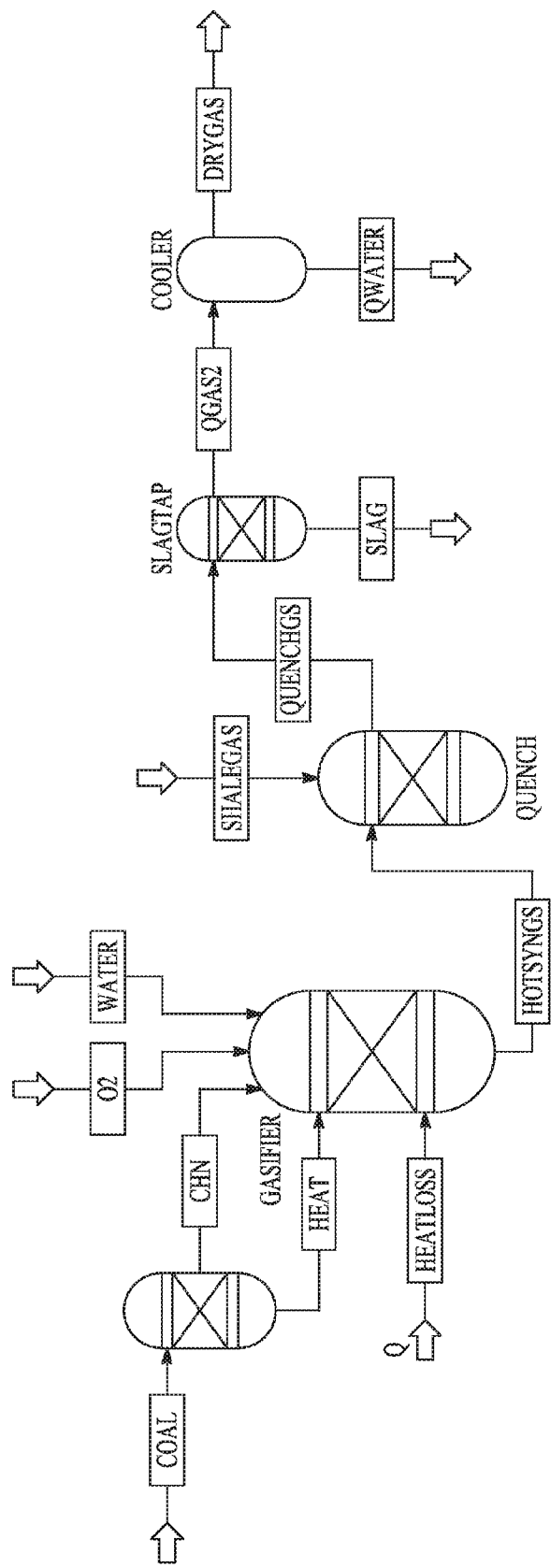
FIG. 1 illustrates a model representation of a gasification process with a quench, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups.

The term "solvent" as used herein refers to a liquid that can dissolve a solid, liquid, or gas. Non-limiting examples of solvents are silicones, organic compounds, water, alcohols, ionic liquids, and supercritical fluids.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to a temperature of about 15° C. to 28° C.

Method of Cooling Syngas.

In various embodiments, the present invention provides a method of cooling syngas. The method can include contacting a hot syngas with methane, light hydrocarbons, or a combination thereof. The hot syngas can include water and can have a temperature of about 800° C. to about 3000° C. The contacting can be effective to endothermically react the methane or light hydrocarbons with the water in the hot syngas to form carbon monoxide and hydrogen. The contacting can provide a cooled syngas having a lower temperature than the hot syngas.

The hot syngas can be any suitable syngas, such as a synthesis gas, a synthetic gas, or a producer gas. The syngas can be a product of a gasification process. The gasification process can provide the hot syngas from a feed mixture that includes a nonpetroleum fossil fuel, a petroleum residue, biomass, or a combination thereof. In a gasification process, the feed mixture is reacted without combustion with a controlled amount of oxygen, steam, or a combination thereof to produce a hot syngas product mixture including carbon monoxide, hydrogen, and sometimes carbon dioxide. The nonpetroleum fossil fuel can include coal, coal tar, wax from a Fischer-Tropsch (FT) process, tar sand, bitumen, natural gas, shale gas, or a combination thereof. Examples of coal can include lignite, brown coal, jet coal, subbituminous coal, bituminous coal, steel coal, anthracite, and graphite. The coal can be in any suitable form, such as pulverized coal, coal powder, or coal dust. Examples of petroleum residue can include petroleum refinery residue such as petroleum waste greases and other by-products of petroleum refining, and petroleum greases and by-products from other industrial processes. Examples of biomass can include wood, crop residue, forest residue, switchgrass and other like materials, residues from various manufacturing processes, algae and aquatic species. Various blends of fossil fuels, petroleum residues, and biomass can be used as a gasification feedstock, with blend ratios of each independently being about 0 wt % to about 100 wt %. In various embodiments, the method can include performing a gasification process to form the hot syngas. In other embodiments, a gasification process to form the hot syngas occurs before the method is performed.

The hot syngas can include carbon monoxide and hydrogen. For example, about 20 vol % to about 70 vol % of the hot syngas can be carbon monoxide, about 30 vol % to about 60 vol %, about 30 vol % to about 50 vol %, about 40 vol % to about 70 vol %, such as about 20 vol % or less, or about 22, 24, 26, 28, 30, 32, 34, 36, 38, 40, 42, 44, 46, 48, 50, 52, 54, 56, 58, 60, 62, 64, 66, 68, or about 70 vol % or more. About 20 vol % to about 70 vol % of the hot syngas can be hydrogen, or about 30 vol % to about 60 vol %, about 30 vol % to about 50 vol %, about 40 vol % to about 70 vol %, such as about 20 vol % or less, or about 22, 24, 26, 28, 30, 32, 34, 36, 38, 40, 42, 44, 46, 48, 50, 52, 54, 56, 58, 60, 62, 64, 66, 68, or about 70 vol % or more. The hot syngas can include carbon dioxide. For example, about 1 vol % to about 50 vol % of the hot syngas can be carbon dioxide, or about 10 vol % to about 40 vol %, or about 1 vol % or less, or about 2 vol %, 4, 6, 8, 10, 12, 14, 16, 18, 20, 22, 24, 26, 28, 30, 32, 34, 36, 38, 40, 42, 44, 46, 48, or about 50 vol % or more.

The hot syngas can have a temperature of about 800° C. to about 3000° C., such as about 800° C. to about 2000° C., about 800° C. to about 1600° C., 1000° C. to about 1800° C., 1200° C. to about 1600° C., or about 800° C. or less, or about 850° C., 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, or about 3000° C. or more.

The method can include contacting the hot syngas with methane or light hydrocarbons. The contacting can be any suitable contacting, such that the contacting is effective to endothermically react the methane or light hydrocarbons with water in the hot syngas to form carbon monoxide and hydrogen. The contacting can include injecting the methane or light hydrocarbons (e.g., or a composition that includes the methane or light hydrocarbons) into a reactor along with the hot syngas. The contacting can occur in the presence of a suitable catalyst that catalyzes the endothermic reaction of the methane or light hydrocarbons and the water. The catalyst can include a transition metal (e.g., any element in the d-block of the periodic table, including groups 3-12), a noble metal (e.g., ruthenium, rhodium, palladium, silver, osmium, iridium platinum, gold, mercury iridium, copper), or a combination thereof. The catalyst can include Ni, Co, Ru, Rh, Ir, Pd, Pt, Au, Ag, Sn, Cu, Mo, Fe, Gd, B, or a combination thereof. The catalyst can be a catalyst that is at least partially resistant to deactivation by sulfur. The catalyst can be a supported catalyst, or an unsupported catalyst. In some embodiments, the contacting occurs in an environment that is free of such a catalyst. In some embodiments, the contacting occurs in two stages where the first stage is at a higher temperature than the second stage and where the first stage is non-catalytic and the second stage is catalytic. In some embodiments, the first stage is also catalytic. In some embodiments, neither stage is catalytic. In some embodiments, the first stage is catalytic and the second stage is non-catalytic. In some embodiments, filtration occurs between the first and second stages which can be performed using a cyclone, candle filter, or other suitable filtration device.

The methane contacted with the hot syngas can be in a composition with one or more additional components. The methane can be any suitable proportion of the composition that includes methane that is contacted to the hot syngas, such as about 10 vol % to about 100 vol % methane, about 30 vol % to about 100 vol % methane, or about 50 vol % to about 100 vol % methane, or about 10 vol % or less methane, or about 12 vol %, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 95, 96, 97, 98, 99, 99.9, or about 99.99 vol % or more methane. The composition that includes methane can be pipeline quality natural gas, or unprocessed mixtures such as shale gas. The composition that includes methane can be unprocessed natural gas (e.g., gas taken directly from a wellhead). The composition that includes methane can be a tail gas from a catalytic process such as a Fischer-Tropsch process. The composition that includes methane can be free of any desulfurization.

The light hydrocarbons can be one or more independently selected ($C_2$-$C_{10}$) hydrocarbons, or one or more independently selected ($C_2$-$C_6$) hydrocarbons, such as ethane, propane, butane, pentane, and hexane. The light hydrocarbons can include alkanes, alkenes, or aromatics, and can be linear, branched, or cyclic. The light hydrocarbons contacted with the hot syngas can be in a composition with one or more additional components. The light hydrocarbons can be any suitable proportion of the composition that includes light hydrocarbons that is contacted to the hot syngas, such as about 0 vol %, or such as about 0.001 vol % to about 100 vol %, or about 0.001 vol % or less, about 0.01 vol %, 0.1, 1, 2, 3, 4, 5, 6, 8, 10, 12, 14, 16, 18, 20, 25, 30, 35, 40, 45, 50, 55, 60, 65, 70, 75, 80, 85, 86, 88, 90, 91, 92, 93, 94, 95, 96, 97, 98, 99, 99.9, 99.99 vol %, or about 100 vol %. The composition that includes light hydrocarbons can be natural gas, such as shale gas. The composition that includes light hydrocarbons can be unprocessed natural gas (e.g., gas taken directly from a wellhead). The composition that includes light hydrocarbons can be a tail gas from a catalytic process such as a Fischer-Tropsch process. The composition that includes light hydrocarbons can be free of any desulfurization.

The methane, light hydrocarbons, or a combination thereof that is contacted with the hot syngas can be added to the hot syngas at any suitable rate, such that the endothermic reaction of methane or light hydrocarbons with water occurs and the hot syngas is cooled as described herein. The methane, light hydrocarbons, or a combination thereof can be added at a rate (by mass) that is about 0.01% to about 50% of the rate of consumption of the feed mixture (by mass) by the gasification process, or about 5 wt % to about 25 wt %, or about 0.01%, 0.1%, 1%, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 42, 44, 46, 48, or about 50% or more of the rate of consumption of the feed mixture by the gasification process.

The hot syngas includes water. The water in the hot syngas is in the form of steam. The water in the hot syngas can include water that is added during a gasification process to form the hot syngas, water that is added to the hot syngas after a gasification process that formed the hot syngas, water that is added with the methane or light hydrocarbons that are contacted with the hot syngas, or a combination thereof. At least some of the water in the hot syngas can be water added during a gasification process to form the hot syngas. In various embodiments, the water that reacts with the methane or light hydrocarbons is free of water added after a gasification process that formed the hot syngas (e.g., in some embodiments, no addition of water occurs after the gasification process). Water added during or after the gasification process can be added in the form of steam or liquid water, wherein addition of liquid water results in a phase change to steam with a corresponding absorption of energy as a result of the phase change. Any suitable proportion of the hot syngas can be water, such as about 1 vol % to about 50 vol %, about 10 vol % to about 30 vol %, about 15 vol % to about 25 vol %, or about 1 vol % or less, or about 2 vol %, 3, 4, 5, 6, 8, 10, 12, 14, 16, 18, 20, 25, 30, 35, 40, 45, or about 50 vol % or more.

The contacting of the methane and the hot syngas is effective to endothermically react the methane with the water in the hot syngas to form carbon monoxide and hydrogen, as shown by the reaction:

$$CH_4 + H_2O \rightleftharpoons CO + 3H_2 \quad \Delta H = +206 \text{ kJ/mol}.$$

Alternatively or in addition to the reaction of methane with water, other hydrocarbons having two or more carbon atoms (e.g., light hydrocarbons) can also react with the water to form hydrogen along with other products. The contacting of the light hydrocarbons and the hot syngas can be effective to endothermically react the light hydrocarbons with the water in the hot syngas to form carbon monoxide and hydrogen, as shown by the following endothermic reaction (with a ΔH that varies depending on the value of n):

$$C_nH_{2n+2} + nH_2O \rightleftharpoons nCO + (2n+1)H_2.$$

Any other suitable reactions can occur during the contacting of the methane or light hydrocarbons and the hot syngas. For example, the following reactions can occur:

$$CO + H_2O \rightleftharpoons CO_2 + H_2 \quad \Delta H = -41 \text{ kJ/mol}$$

$$CH_4 + 2H_2O \rightleftharpoons CO_2 + 4H_2 \quad \Delta H = +165 \text{ kJ/mol}$$

The cooled syngas can have any suitable temperature that is lower than the temperature of the hot syngas, such as about 50° C. to about 1000° C. lower than the temperature of the hot syngas, about 50° C. to about 800° C., about 300° C. to about 1000° C., about 300° C. to about 800° C., or about 50° C. lower or less, or about 75° C., 100, 125, 150, 175, 200, 225, 250, 275, 300, 325, 350, 375, 400, 425, 450, 475, 500, 525, 550, 575, 600, 625, 650, 675, 700, 725, 750, 775° C., or about 800° C. or more. The temperature of the cooled syngas can be about 500° C. to about 2950° C., such as about 500° C. to about 1950° C., 600° C. to about 1750° C., 800° C. to about 1550° C., or about 500° C. or less, or about 550° C., 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, or about 2950° C. or more. Any suitable proportion of the total heat removed from the hot syngas during transformation to the cooled syngas can be heat removed via the endothermic reaction of methane, light hydrocarbons, or a combination thereof with water to form carbon monoxide and steam, such as about 1% to about 100% of the total heat removed, about 50% to about 100%, about 60% to about 90%, about 70% to about 80%, or about 50% or less, or about 1% or less, or about 2, 3, 4, 5, 10, 15, 20, 25, 30, 35, 40, 45, 50, 55, 60, 62, 64, 66, 68, 70, 72, 74, 76, 78, 80, 82, 84, 86, 88, 90, 91, 92, 93, 94, 95, 96, 97, 98, 99, 99.9, or about 99.99% or more.

The endothermic reaction of the methane with the water can consume any suitable amount of the methane contacted with the syngas. For example, the endothermic reaction of the methane with the water in the hot syngas can consume about 1 mol % to about 100 mol % of the methane contacted with the hot syngas (e.g., corresponding to about 99 mol % to about 0 mol % methane slip into the cooled syngas), or about 80 mol % to about 100 mol % (e.g., corresponding to about 20 mol % to about 0 mol % methane slip into the cooled syngas), or about 1 mol % or less, or about 2 mol %, 3, 4, 5, 6, 8, 10, 15, 20, 25, 30, 35, 40, 45, 50, 55, 60, 65, 70, 72, 74, 76, 77, 78, 79, 80, 81, 82, 83, 84, 85, 86, 87, 88, 89, 90, 91, 92, 93, 94, 95, 96, 97, 98, 99, 99.9 mol %, or about 99.99 mol % or more.

The endothermic reaction of the light hydrocarbons with the water can consume any suitable amount of the light hydrocarbons contacted with the syngas. For example, the endothermic reaction of the light hydrocarbons with the water in the hot syngas can consume about 1 mol % to about 100 mol % of the light hydrocarbons contacted with the hot syngas (e.g., corresponding to about 99 mol % to about 0 mol % light hydrocarbon slip into the cooled syngas), or about 80 mol % to about 100 mol % (e.g., corresponding to about 20 mol % to about 0 mol % light hydrocarbon slip into the cooled syngas), or about 1 mol % or less, or about 2 mol %, 3, 4, 5, 6, 8, 10, 15, 20, 25, 30, 35, 40, 45, 50, 55, 60, 65, 70, 72, 74, 76, 77, 78, 79, 80, 81, 82, 83, 84, 85, 86, 87, 88, 89, 90, 91, 92, 93, 94, 95, 96, 97, 98, 99, 99.9 mol %, or about 99.99 mol % or more.

The endothermic reaction of the methane, light hydrocarbons, or a combination thereof with the water can consume any suitable amount of the water in the hot syngas. For example, the endothermic reaction of the methane or light hydrocarbons with the water can consume about 1 mol % to about 100 mol % of the water in the hot syngas, about 80 mol % to about 100 mol %, about 1 mol % or less, or about 2 mol %, 3, 4, 5, 6, 8, 10, 15, 20, 25, 30, 35, 40, 45, 50, 55, 60, 65, 70, 72, 74, 75, 76, 77, 78, 79, 80, 81, 82, 83, 84, 85, 86, 87, 88, 89, 90, 91, 92, 93, 94, 95, 96, 97, 98, 99, 99.9, or about 99.99 mol % or more.

The cooled syngas can have a greater concentration of hydrogen and carbon monoxide than the hot syngas, due to the endothermic reaction of the methane or light hydrocarbons with the water to form carbon monoxide and hydrogen. The cooled syngas can have a higher ratio of hydrogen to carbon monoxide than the hot syngas, due to the endothermic reaction of the methane or light hydrocarbons with the water to form carbon monoxide and hydrogen, which can form three moles of hydrogen and one mole of carbon monoxide per one mole of methane and per one mole of water.

The cooled syngas can have any suitable composition. For example, about 20 vol % to about 90 vol % of the cooled syngas can be carbon monoxide, about 20 vol % to about 70 vol %, about 30 vol % to about 60 vol %, about 30 vol % to about 50 vol %, about 40 vol % to about 70 vol %, such as about 20 vol % or less, or about 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, or about 90 vol % or more. About 20 vol % to about 90 vol % of the cooled syngas can be hydrogen, about 20 vol % to about 70 vol %, or about 30 vol % to about 60 vol %, about 30 vol % to about 50 vol %, about 40 vol % to about 70 vol %, such as about 20 vol % or less, or about 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, or about 90 vol % or more. The cooled syngas can include carbon dioxide. For example, about 1 vol % to about 50 vol % of the cooled syngas can be carbon dioxide, or about 10 vol % to about 40 vol %, or about 1 vol % or less, or about 2 vol %, 4, 6, 8, 10, 12, 14, 16, 18, 20, 22, 24, 26, 28, 30, 32, 34, 36, 38, 40, 42, 44, 46, 48, or about 50 vol % or more. The cooled syngas can include methane or light hydrocarbons. For example, about 0 vol % to about 30 vol % of the cooled syngas can be methane or light hydrocarbons, or about 0.01 vol % to about 10 vol %, or about 0.01 vol % or less, or about 0.1 vol %, 1, 2, 3, 4, 5, 6, 8, 10, 12, 14, 16, 18, 20, 22, 24, 26, 28, or about 30 vol % or more.

The method can include performing any suitable processing steps prior to or after the contacting of the methane or light hydrocarbons and the hot syngas to form the cooled syngas. For example, the method can include performing a deslagging step to remove particles from the syngas before or after the methane or light hydrocarbon quench. The method can include performing additional cooling processes other than the methane or hydrocarbon quench, before or after the methane or light hydrocarbon quench.

EXAMPLES

Various embodiments of the present invention can be better understood by reference to the following Examples which are offered by way of illustration. The present invention is not limited to the Examples given herein.

Example 1

Aspen Plus® software was used to model the reaction of syngas with pipeline quality methane and shale gas to determine the amount of cooling that is feasible without having excess introduction of hydrocarbons into the gas stream. Tampa Electric's Polk Power Station integrated gasification combined cycle (IGCC) facility was used as the modeling basis for this study. A model was built in Aspen Plus that represents a simplified entrained-flow gasifier and quench system, illustrated in FIG. 1. No catalytic influences were considered in this model.

General Conditions.

The fuel feed rate, oxygen flow rate, and water feed rate were determined according to published operational estimates at the Polk Power Station IGCC. The facility is a 250-MW net power station, with a nominal coal feed rate of 2200 tons/day, oxygen feed rate of 2171 tons/day, and slurry water feed rate of 972 tons/day. Pittsburgh No. 8 was used as the coal for the study. The exit temperature was also set based on the data presented and was fixed to 2600° F. by adjusting the heat loss in the gasifier. The gasifier block represents a rigorous phase and chemical equilibrium calculation based on Gibbs free energy minimization. The hot syngas then goes into the quench module which is another phase and chemical equilibrium reactor. The exit temperature of this reactor was calculated by the model and depends on the heat capacity and endothermic reaction cooling that occurs in the unit operation. Both of the reactors were equilibrium-based calculations and did not consider reaction kinetics. Downstream, a slag tap separator block separated the solid components from the gas, and then a cooler block uses a flash calculation to determine the condition of the gas on a dry basis after water condensation.

Figure 2:
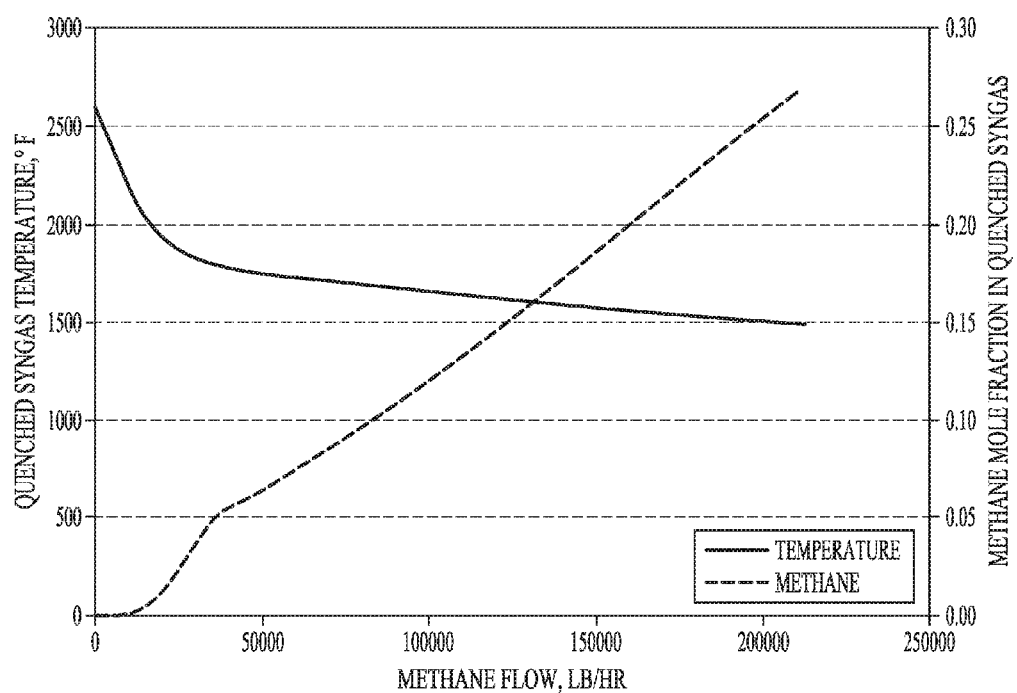
FIG. 2 illustrates methane flow versus quenched syngas temperature and methane mole fraction in quenched syngas, in accordance with various embodiments.

The model was run in two configurations. In one configuration, only methane was injected as the gas quench. In the second configuration, a shale gas mixture (including methane and light hydrocarbons) was injected into the quench zone that contained 65% methane, 30% ethane, 4% propane, and 1% butane. The results of the methane-only configuration are shown in FIG. 2. The results show that the temperature of the syngas can be brought down from 2600° to 2000° F. with 18,000 lb/hr of methane. This is equivalent to 216 tons/day of methane or approximately 10% of the coal feed on a weight basis. The methane slip in this scenario is approximately 1%. From that point forward, a rapid rise in methane concentration is observed with cooling temperatures. To achieve a temperature of 1800° F., methane concentration increases to 5%. After that, the reaction of methane with steam appears to be at equilibrium, and the additional cooling observed is only due to the heat capacity of the cool incoming methane.

Figure 3:
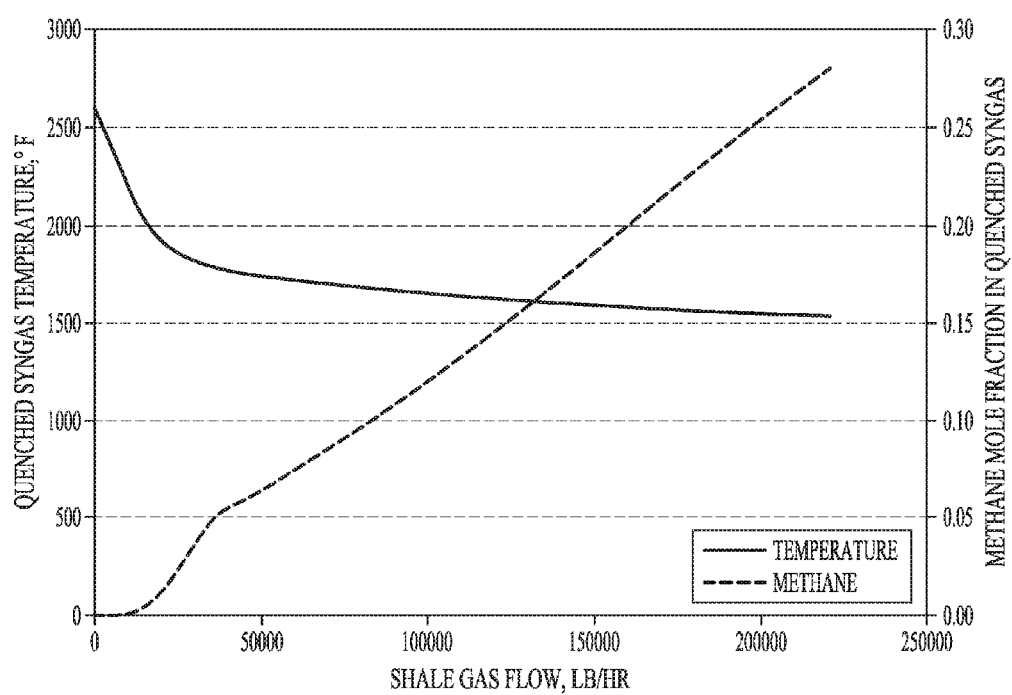
FIG. 3 illustrates shale gas flow versus quenched syngas temperature and methane mole fraction in quenched syngas, in accordance with various embodiments.

FIG. 3 illustrates the impact of shale gas injection on the cooling of the syngas. The results were similar to the methane injection results with the exception that the model shows the heavier hydrocarbons reformed more readily. The total concentration of heavier hydrocarbons in the syngas for all of the scenarios was less than 1%. This may not hold true in a kinetically limited system. The data indicate there is potential to inject wellhead gases directly into a gasification system as a quench medium.

Figure 4:
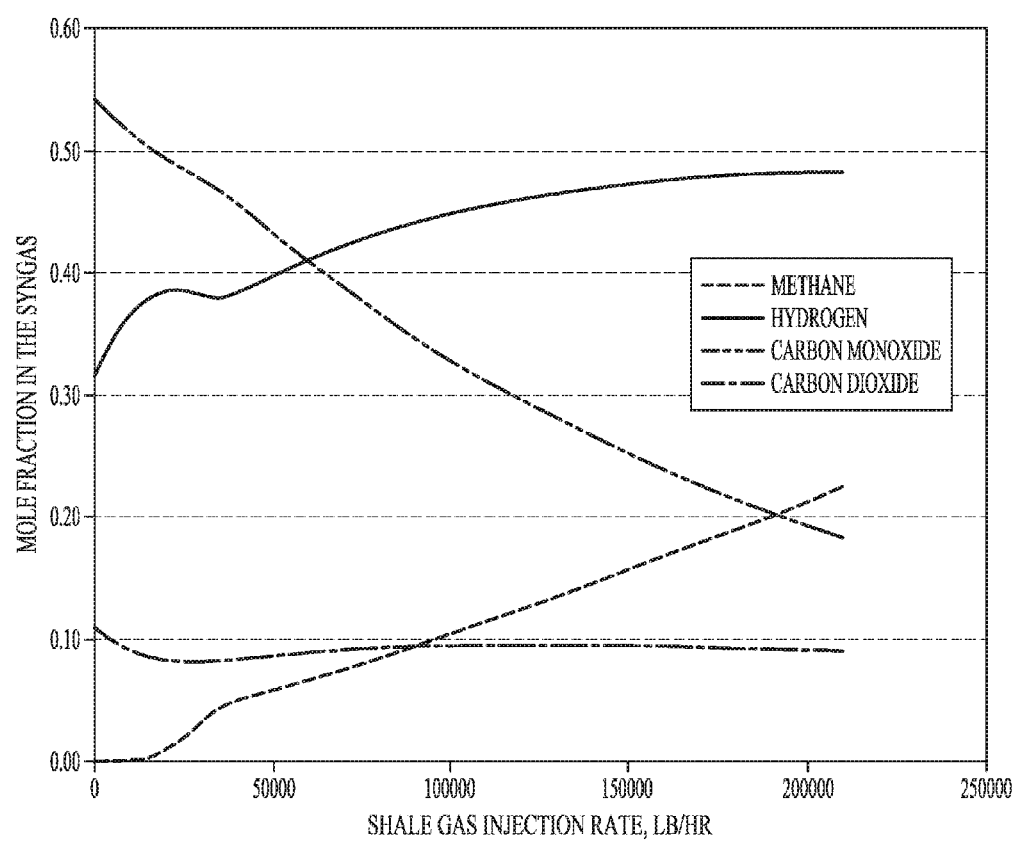
FIG. 4 illustrates shale gas injection rate versus mole fraction of methane, hydrogen, carbon monoxide, and carbon dioxide in the syngas, in accordance with various embodiments.

FIG. 4 illustrates the concentration of the major syngas components when shale gas is injected as a quench medium. A significant increase in hydrogen concentration was observed with increasing gas injection, up to the 18,000-lb/hr injection rate. This indicates that significant reforming occurs up to this point. The decrease in hydrogen concentration after that point indicates the rate of gas injection dilutes the syngas more rapidly than hydrogen is produced and the equilibrium state of the reaction products is changing with temperature. After about 35,000-lb/hr injection rate, or 20% of the coal feed rate, the change in reaction products was dominated by dilution with methane.

Figure 5:
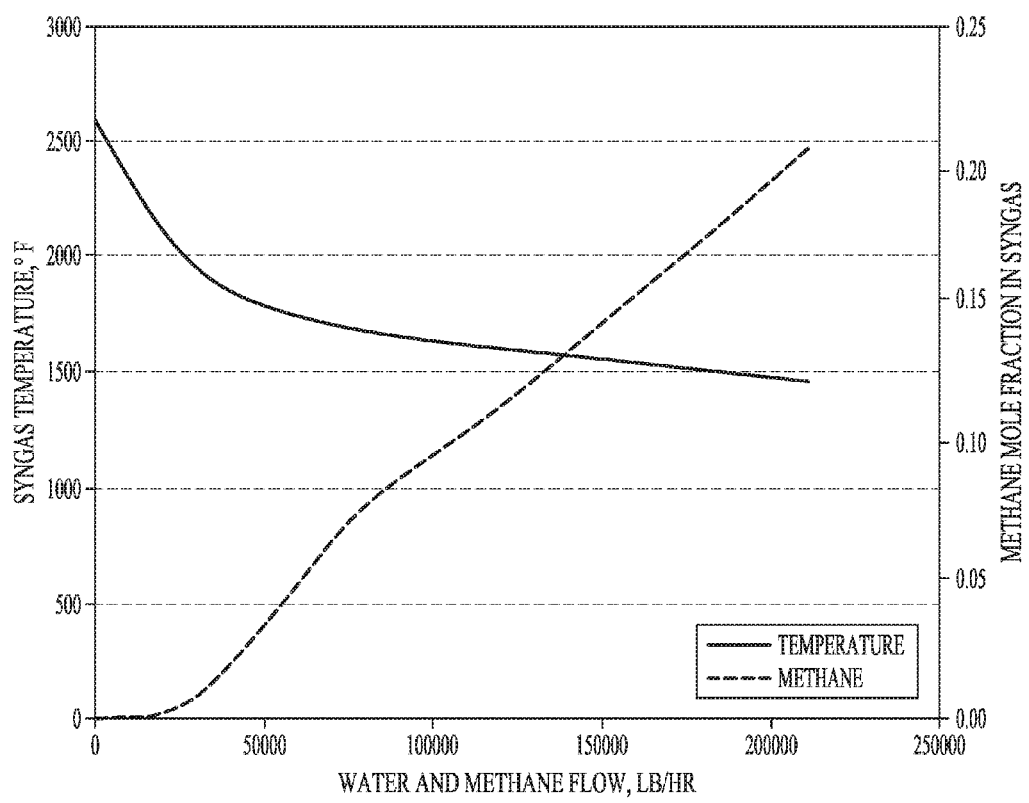
FIG. 5 illustrates water and methane flow versus syngas temperature and methane mole fraction in syngas, in accordance with various embodiments.

Consideration was also made to model the quench process with syngas from a transport reactor integrated gasification (TRIG) system. This system may have additional steam at the output, so modeling was performed using the same process model but injecting equal parts methane and water into the quench zone. FIG. 5 illustrates the results. The results indicate that improved performance may occur with the simultaneous injection of water and methane or shale gas.

The gas injection quench process appears to be a viable option for cooling gasifier syngas to temperatures to at least as low as about 1800° F. without catalyst and temperatures at least as low as about 1000° F. with a reforming catalyst. Cooling to this temperature would greatly reduce syngas cooler plugging and fouling issues, and the energy utilized in the cooling is not lost because additional syngas is produced for downstream use. This technology appears viable for both methane and shale gas. The modeling effort utilized reaction equilibrium to make this determination. Further study would be needed to develop a reactive quench system that is kinetically limited and determine design parameters that would allow the reactions to approach equilibrium.

Example 2

Figure 6:
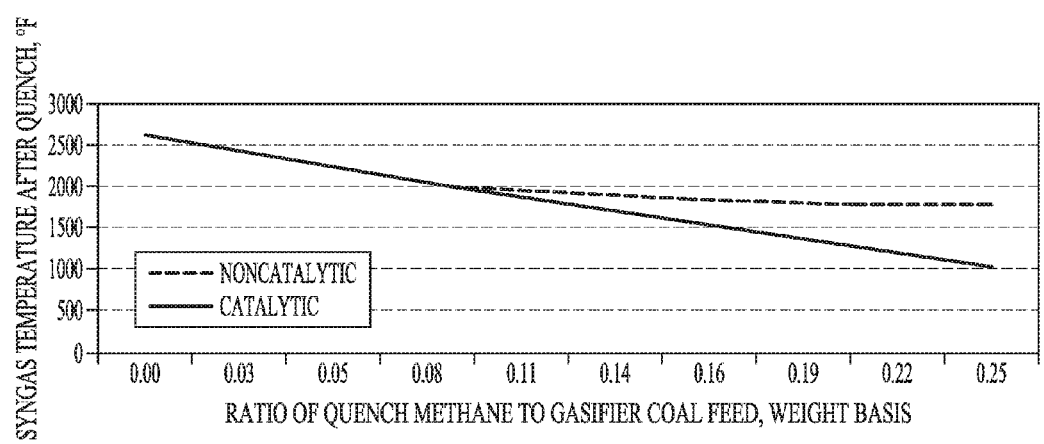
FIG. 6 illustrates ratio of quench methane to gasifier coal feed versus syngas temperature after quench for catalytic or noncatalytic reaction of methane with water, in accordance with various embodiments.

Using Aspen Plus® software, a computer model was designed. Inputs from a commercial GE gasifier at Tampa Electric's Polk Power Station integrated gasification combined cycle (IGCC) facility were used to model the syngas quality at the entrance of the quench section. FIG. 6 illustrates the results, and shows the level of cooling that can be achieved utilizing methane with and without catalytic influences. The data are presented as a weight ratio of the methane input compared to the coal feed rate in the gasifier. In the noncatalytic case, the steam methane reforming reactions are driven forward to achieve temperatures of approximately 1950° F. After this point, additional cooling achieved is almost exclusively from the heat capacity of the methane. In the catalytic case, cooling below 1200° F. is achieved with a methane to coal ratio of about 0.22. Simplified assumptions were used in this modeling effort, in line with the General Conditions of Example 1.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of cooling syngas, the method comprising:

contacting a hot syngas with methane, light hydrocarbons, or a combination thereof, the hot syngas comprising water and having a temperature of about 800° C. to about 3000° C., wherein the contacting is effective to endothermically react the methane or light hydrocarbons with the water in the hot syngas to form carbon monoxide and hydrogen and to provide a cooled syngas having a lower temperature than the hot syngas.

Embodiment 2 provides the method of Embodiment 1, wherein the temperature of the hot syngas is about 800° C. to about 1600° C.

Embodiment 3 provides the method of any one of Embodiments 1-2, wherein the temperature of the hot syngas is about 1300° C. to about 1600° C.

Embodiment 4 provides the method of any one of Embodiments 1-3, wherein the cooled syngas has a temperature about 50° C. to about 1000° C. lower than the temperature of the hot syngas.

Embodiment 5 provides the method of any one of Embodiments 1-4, wherein the cooled syngas has a temperature that is about 300° C. to about 1000° C. lower than the temperature of the hot syngas.

Embodiment 6 provides the method of any one of Embodiments 1-5, wherein the cooled syngas has a temperature about 300° C. to about 800° C. lower than the temperature of the hot syngas.

Embodiment 7 provides the method of any one of Embodiments 1-6, wherein about 50% to about 100% of total heat removed from the hot syngas during transformation of the hot syngas to the cooled syngas is heat removed via the endothermic reaction of the methane, the light hydrocarbons, or a combination thereof, with the water.

Embodiment 8 provides the method of any one of Embodiments 1-7, wherein about 90% to about 100% of total heat removed from the hot syngas during transformation of the hot syngas to the cooled syngas is heat removed via the endothermic reaction of the methane, the light hydrocarbons, or a combination thereof, with the water.

Embodiment 9 provides the method of any one of Embodiments 1-8, wherein contacting the hot syngas with the methane or light hydrocarbons comprises contacting the hot syngas with a gas composition that comprises the methane, the light hydrocarbons, or a combination thereof.

Embodiment 10 provides the method of any one of Embodiments 1-9, wherein the gas composition comprises about 10 vol % to about 100 vol % methane.

Embodiment 11 provides the method of any one of Embodiments 1-10, wherein the gas composition comprises about 0.001 vol % to about 100 vol % light hydrocarbons.

Embodiment 12 provides the method of any one of Embodiments 1-11, wherein the light hydrocarbons are ($C_2$-$C_{10}$)hydrocarbons.

Embodiment 13 provides the method of any one of Embodiments 1-12, wherein the light hydrocarbons are ($C_2$-$C_6$)hydrocarbons.

Embodiment 14 provides the method of any one of Embodiments 1-13, wherein contacting the hot syngas with the methane or light hydrocarbons comprises contacting the hot syngas with natural gas, shale gas, tail gas from a catalytic process, or a combination thereof.

Embodiment 15 provides the method of any one of Embodiments 1-14, wherein the endothermic reaction of the methane or light hydrocarbons with the hot syngas consumes about 1 mol % to about 100 mol % of the methane contacted with the hot syngas.

Embodiment 16 provides the method of any one of Embodiments 1-15, wherein the endothermic reaction of the methane or light hydrocarbons with the hot syngas consumes about 80 mol % to about 100 mol % of the methane contacted with the hot syngas.

Embodiment 17 provides the method of any one of Embodiments 1-16, wherein the endothermic reaction of the methane or light hydrocarbons with the hot syngas consumes about 1 mol % to about 100 mol % of the light hydrocarbons contacted with the hot syngas.

Embodiment 18 provides the method of any one of Embodiments 1-17, wherein the endothermic reaction of the methane or light hydrocarbons with the hot syngas consumes about 80 mol % to about 100 mol % of the light hydrocarbons contacted with the hot syngas.

Embodiment 19 provides the method of any one of Embodiments 1-18, wherein the contacting of the hot syngas and the methane or light hydrocarbons comprises contacting in the presence of a catalyst that catalyzes the endothermic reaction of the methane or light hydrocarbons with the hot syngas.

Embodiment 20 provides the method of Embodiment 19, wherein the catalyst comprises a transition metal, a noble metal, or a combination thereof.

Embodiment 21 provides the method of any one of Embodiments 19-20, wherein the catalyst comprises Ni, Co, Ru, Rh, Ir, Pd, Pt, Au, Ag, Sn, Cu, Mo, Fe, Gd, B, or a combination thereof.

Embodiment 22 provides the method of any one of Embodiments 19-21, wherein the catalyst is a supported catalyst.

Embodiment 23 provides the method of any one of Embodiments 1-22, wherein the hot syngas is provided via a gasification process.

Embodiment 24 provides the method of Embodiment 23, wherein the gasification process provides the hot syngas from a feed mixture, the feed mixture comprising a nonpetroleum fossil fuel, a petroleum residue, biomass, or a combination thereof.

Embodiment 25 provides the method of any one of Embodiments 23-24, wherein a rate of addition of the methane, light hydrocarbons, or a combination thereof contacted with the hot syngas is about 0.01% to about 50% of the rate of consumption of the feed mixture by the gasification process.

Embodiment 26 provides the method of any one of Embodiments 23-25, wherein a rate of addition of the methane, light hydrocarbons, or a combination thereof contacted with the hot syngas is about 5% to about 25% of the rate of consumption of the feed mixture by the gasification process.

Embodiment 27 provides the method of any one of Embodiments 23-26, wherein the nonpetroleum fossil fuel comprises coal, coal tar, wax from a Fischer-Tropsch (FT) process, tar sand, bitumen, natural gas, shale gas, or a combination thereof.

Embodiment 28 provides the method of any one of Embodiments 1-27, further comprising performing gasification to form the hot syngas.

Embodiment 29 provides the method of any one of Embodiments 1-28, wherein the hot syngas comprises carbon monoxide and hydrogen.

Embodiment 30 provides the method of Embodiment 29, wherein the hot syngas further comprises carbon dioxide.

Embodiment 31 provides the method of any one of Embodiments 1-30, wherein at least some of the water in the hot syngas is injected into the hot syngas.

Embodiment 32 provides the method of any one of Embodiments 1-31, wherein none of the water in the hot syngas is injected into the hot syngas.

Embodiment 33 provides the method of any one of Embodiments 31-32, wherein at least some of the water in the hot syngas is added during a gasification process to form the hot syngas to form the hot syngas, after a gasification process to form the hot syngas, with the methane or light hydrocarbons, or a combination thereof.

Embodiment 34 provides the method of any one of Embodiments 31-33, wherein at least some of the water in the hot syngas is added during a gasification process to form the hot syngas.

Embodiment 35 provides the method of any one of Embodiments 1-34, further comprising adding at least some of the water in the hot syngas into the hot syngas.

Embodiment 36 provides the method of any one of Embodiments 1-35, wherein the syngas comprises about 1 vol % to about 50 vol % water.

Embodiment 37 provides the method of any one of Embodiments 1-36, wherein the syngas comprises about 10 vol % to about 30 vol % water.

Embodiment 38 provides the method of any one of Embodiments 1-37, wherein the endothermic reaction of the methane, light hydrocarbons, or a combination thereof with the water consumes about 1 mol % to about 100 mol % of the water in the hot syngas.

Embodiment 39 provides the method of any one of Embodiments 1-38, wherein the endothermic reaction of the methane, light hydrocarbons, or a combination thereof with the water consumes about 80 mol % to about 100 mol % of the water in the hot syngas.

Embodiment 40 provides the method of any one of Embodiments 1-39, wherein the cooled syngas has a greater concentration of carbon monoxide and hydrogen than the hot syngas.

Embodiment 41 provides the method of any one of Embodiments 1-40, wherein the cooled syngas has a greater ratio of hydrogen to carbon monoxide than the hot syngas.

Embodiment 42 provides the method of any one of Embodiments 1-41, further comprising performing additional cooling of the cooled syngas.

Embodiment 43 provides the method of any one of Embodiments 1-42, further comprising deslagging the cooled syngas, to provide a deslagged syngas.

Embodiment 44 provides a method of cooling syngas, the method comprising:

contacting a hot syngas with methane, light hydrocarbons, or a combination thereof, the hot syngas comprising water and having a temperature of 1300° C. to about 1600° C., wherein the contacting is effective to endothermically react the methane or light hydrocarbons with the water in the hot syngas to form carbon monoxide and hydrogen and to provide a cooled syngas having a temperature about 300° C. to about 1000° C. lower than the temperature of the hot syngas, wherein about 50% to 1000% of total heat removed from the hot syngas during transformation of the hot syngas to the cooled syngas is heat removed via the endothermic reaction of the methane, light hydrocarbons, or a combination thereof, with the water.

Embodiment 45 provides the apparatus, method, composition, or system of any one or any combination of Embodiments 1-44 optionally configured such that all elements or options recited are available to use or select from.

What is claimed is:

1. A method of cooling syngas, the method comprising:
   contacting a hot syngas with methane, light hydrocarbons, or a combination thereof, the hot syngas comprising water and having a temperature of about 800° C. to about 3000° C., wherein the contacting is effective to endothermically react the methane or light hydrocarbons with the water in the hot syngas to form carbon monoxide and hydrogen and to provide a cooled syngas having a lower temperature than the hot syngas.

2. The method of claim 1, wherein the temperature of the hot syngas is about 800° C. to about 1600° C.

3. The method of claim 1, wherein the cooled syngas has a temperature about 50° C. to about 1000° C. lower than the temperature of the hot syngas.

4. The method of claim 1, wherein about 50% to about 100% of total heat removed from the hot syngas during transformation of the hot syngas to the cooled syngas is heat removed via the endothermic reaction of the methane, the light hydrocarbons, or a combination thereof, with the water.

5. The method of claim 1, wherein contacting the hot syngas with the methane or light hydrocarbons comprises contacting the hot syngas with a gas composition that comprises the methane, the light hydrocarbons, or a combination thereof.

6. The method of claim 1, wherein the gas composition comprises about 10 vol % to about 100 vol % methane.

7. The method of claim 1, wherein the gas composition comprises about 0.001 vol % to about 100 vol % light hydrocarbons.

8. The method of claim 1, wherein the light hydrocarbons are $(C_2-C_{10})$hydrocarbons.

9. The method of claim 1, wherein contacting the hot syngas with the methane or light hydrocarbons comprises contacting the hot syngas with natural gas, shale gas, tail gas from a catalytic process, or a combination thereof.

10. The method of claim 1, wherein the contacting of the hot syngas and the methane or light hydrocarbons comprises contacting in the presence of a catalyst that catalyzes the endothermic reaction of the methane or light hydrocarbons with the hot syngas.

11. The method of claim 1, further comprising performing gasification to form the hot syngas.

12. The method of claim 11, wherein the gasification process provides the hot syngas from a feed mixture, the feed mixture comprising a nonpetroleum fossil fuel, a petroleum residue, biomass, or a combination thereof.

13. The method of claim 1, wherein the hot syngas comprises carbon monoxide and hydrogen.

14. The method of claim 1, wherein none of the water in the hot syngas is injected into the hot syngas.

15. The method of claim 1, further comprising adding at least some of the water in the hot syngas into the hot syngas.

16. The method of claim 1, wherein the syngas comprises about 1 vol % to about 50 vol % water.

17. The method of claim 1, wherein the endothermic reaction of the methane, light hydrocarbons, or a combination thereof with the water consumes about 1 mol % to about 100 mol % of the water in the hot syngas.

18. The method of claim 1, wherein the cooled syngas has a greater concentration of carbon monoxide and hydrogen than the hot syngas.

19. The method of claim 1, wherein the cooled syngas has a greater ratio of hydrogen to carbon monoxide than the hot syngas.

20. A method of cooling syngas, the method comprising:
   contacting a hot syngas with methane, light hydrocarbons, or a combination thereof, the hot syngas comprising water and having a temperature of 1300° C. to about 1600° C., wherein the contacting is effective to endothermically react the methane or light hydrocarbons with the water in the hot syngas to form carbon monoxide and hydrogen and to provide a cooled syngas having a temperature about 300° C. to about 1000° C. lower than the temperature of the hot syngas, wherein about 50% to 100% of total heat removed from the hot syngas during transformation of the hot syngas to the cooled syngas is heat removed via the endothermic reaction of the methane, light hydrocarbons, or a combination thereof, with the water.

* * * * *